United States Patent
Sunada

(10) Patent No.: US 9,030,715 B2
(45) Date of Patent: May 12, 2015

(54) SHEET CONVEYANCE DEVICE THAT CAN DETECT SHEET SIZE

(71) Applicant: Canon Kabushiki Kaisha, Tokyo (JP)

(72) Inventor: Hidenori Sunada, Abiko (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/956,617

(22) Filed: Aug. 1, 2013

(65) Prior Publication Data

US 2014/0043664 A1 Feb. 13, 2014

(30) Foreign Application Priority Data

Aug. 10, 2012 (JP) ................. 2012-178506

(51) Int. Cl.
*H04N 1/00* (2006.01)
(52) U.S. Cl.
CPC ....... *H04N 1/00588* (2013.01); *H04N 1/00713* (2013.01); *H04N 1/00734* (2013.01); *H04N 1/00745* (2013.01); *H04N 1/00766* (2013.01); *H04N 1/00779* (2013.01)
(58) Field of Classification Search
USPC ........ 358/498, 1.14, 488; 399/45, 21, 16, 370
See application file for complete search history.

(56) References Cited

U.S. PATENT DOCUMENTS

| | | | | |
|---|---|---|---|---|
| 5,223,905 | A * | 6/1993 | Yamada et al. | 399/370 |
| 7,167,770 | B1 * | 1/2007 | Akira | 700/304 |
| 8,760,678 | B2 * | 6/2014 | Umi et al. | 358/1.14 |
| 2005/0191065 | A1 * | 9/2005 | Sawanaka et al. | 399/16 |
| 2006/0072139 | A1 * | 4/2006 | Hult et al. | 358/1.13 |
| 2008/0174061 | A1 * | 7/2008 | Kurita | 270/45 |
| 2009/0297201 | A1 * | 12/2009 | Ono | 399/88 |
| 2009/0317095 | A1 * | 12/2009 | Tamaoki | 399/21 |
| 2010/0066795 | A1 * | 3/2010 | Shimamura et al. | 347/104 |
| 2010/0073449 | A1 * | 3/2010 | Yamamoto et al. | 347/104 |
| 2010/0073724 | A1 * | 3/2010 | Kurata | 358/1.15 |
| 2010/0111546 | A1 * | 5/2010 | Kubo | 399/16 |
| 2010/0245859 | A1 * | 9/2010 | Morgan | 358/1.9 |
| 2010/0247115 | A1 * | 9/2010 | Ohshima et al. | 399/16 |
| 2011/0279849 | A1 * | 11/2011 | Umi et al. | 358/1.14 |
| 2012/0262765 | A1 * | 10/2012 | Saito | 358/488 |
| 2013/0195482 | A1 * | 8/2013 | Nakura et al. | 399/45 |

FOREIGN PATENT DOCUMENTS

| | | |
|---|---|---|
| JP | 2002-060089 A | 2/2002 |
| JP | 2005-150947 A | 6/2005 |

* cited by examiner

*Primary Examiner* — King Poon
*Assistant Examiner* — Ted Barnes
(74) *Attorney, Agent, or Firm* — Rossi, Kimms & McDowell LLP

(57) ABSTRACT

A sheet conveyance device is capable of detecting a sheet length in a conveyance direction correctly, and of detecting a length of a non-standard size sheet correctly. A detection unit detects front and rear ends of a sheet conveyed with a conveyance unit. A measurement unit measures sheet length in a conveyance direction based on a detection result of the detection unit. An acquisition unit acquires a reference length of the sheet. A computation unit computes a correction value that is used to correct a length measured by the measurement unit based on length measured and the reference length acquired in a correction mode. A storage unit stores the correction value computed. A determination unit determines sheet length corrected based on the correction value and the length measured at the time of conveyance of a sheet in a mode other than correction mode.

4 Claims, 17 Drawing Sheets

(UNIT: 0.1mm)

| REFERENCE SIZE | REFERENCE LENGTH | SAMPLED LENGTH | DIFFERENCE |
|---|---|---|---|
| A3 PORTRAIT | 4200 | 4183 | +17 |
| A4 PORTRAIT | 2970 | 2957 | +13 |
| POSTCARD PORTRAIT | 1480 | 1475 | +5 |
| (USER DEFINITION 1) | 1950 | 1942 | +8 |
| (USER DEFINITION 2) | 2700 | 2689 | +11 |

FIG. 6

ORIGINAL LENGTH CORRECTION MODE

1. SELECT SHEET SIZE TO BE SAMPLED

| A4 LANDSCAPE ← | B5 LANDSCAPE ← |
| --- | --- |
| A4 PORTRAIT ← | B5 PORTRAIT ← |
| A3 PORTRAIT ← | B4 PORTRAIT ← |
| POSTCARD PORTRAIT ← | USER'S DESIGNATION |

BACK    OK

FIG. 7

ORIGINAL LENGTH CORRECTION MODE

2. DESIGNATE ORIGINAL LENGTH 000.0 mm
(148.0-630.0)

| 1 | 2 | 3 |
| --- | --- | --- |
| 4 | 5 | 6 |
| 7 | 8 | 9 |
| C | 0 | |

BACK    OK

*FIG. 8*

ORIGINAL LENGTH CORRECTION MODE

3. SET ONLY ONE ORIGINAL ON TRAY,
   THEN PUSH START BUTTON

START

BACK    OK

FIG. 13

(UNIT: 0.1mm)

| REFERENCE SIZE | REFERENCE LENGTH | SAMPLED LENGTH | DIFFERENCE |
|---|---|---|---|
| A3 PORTRAIT | 4200 | 4183 | +17 |
| A4 PORTRAIT | 2970 | 2957 | +13 |
| POSTCARD PORTRAIT | 1480 | 1475 | +5 |
| (USER DEFINITION 1) | 1950 | 1942 | +8 |
| (USER DEFINITION 2) | 2700 | 2689 | +11 |

SHEET CONVEYANCE DEVICE THAT CAN DETECT SHEET SIZE

BACKGROUND OF THE INVENTION

1. Field of the Invention

The present invention relates to a sheet conveyance device that has a function of conveying a sheet and a function of detecting a length of a sheet in the conveyance direction.

2. Description of the Related Art

In recent years, a copying machine used in an office is provided with an original reading device that conveys sheet-like originals, which are stacked on an original tray, one by one, and reads them automatically.

When originals are copied using the above-mentioned copying machine continuously, for example, it is necessary to select recording sheets of which sizes correspond to the original sizes. When a user designates a recording sheet, the designated recording sheet is used. On the other hand, when a recording sheet is automatically selected according to the original size, it is necessary to detect the size of the original at the time of reading the original. Accordingly, Japanese Laid-Open Patent Publication (Kokai) No. 2002-060089 (JP 2002-060089A) and Japanese Laid-Open Patent Publication (Kokai) No. 2005-150947 (JP 2005-150947A) disclose techniques for detecting an original length in a conveyance direction during conveyance of the original, for example.

JP 2002-060089A discloses an original reading device that detects the front end and the rear end of an original conveyed using a sensor arranged on an original-conveyance path, counts the number of driving pulses for a stepping motor for conveying an original between the detection timings of the front end and the rear end, and computes the length of the original in the conveyance direction based on the counted number of driving pulses.

The original reading device disclosed in JP 2005-150947A fixes a standard size by detecting a size of an original in a horizontal direction, which is perpendicular to the conveyance direction, during the conveyance of the original, and determines a setting number of driving pulses equivalent to the length of the standard size sheet in the conveyance direction. Then, the original reading device compares the setting number of driving pulses with the number of driving pulses applied to the stepping motor between the detection timings of the front and rear ends. When the difference of them is not larger than an allowed value, the device determines that the counted number of driving pulses becomes a new setting number of driving pulses. When the difference is larger than the allowed value, the device executes an error handling.

However, the device disclosed in JP 2002-060089A cannot detect the length of the original in the conveyance direction correctly when the rotating amount of an original feeding motor becomes larger than that of an ideal original conveyance due to slip of a conveyance roller to the original. In addition to the slip of the conveying roller, errors in accuracies of the conveying roller and the parts of an original-conveyance path, and meandering of an original within the original-conveyance path vary a conveyance state of an original, which obstructs a correct computation of the length of an original in the conveyance direction.

Moreover, since the device disclosed in JP 2005-150947A determines the setting number of driving pulses by finding the standard size of an original based on the width of the original, the correct setting numbers cannot be determined for originals of non-standard sizes that are increasing in recent years, such as checks. Moreover, when a user uses various sizes of originals, the setting numbers that should be stored for the respective original sizes also increase.

SUMMARY OF THE INVENTION

The present invention provides a sheet conveyance device that is capable of detecting a sheet length in a conveyance direction correctly, and of detecting a length of a non-standard size sheet correctly.

Accordingly, a first aspect of the present invention provides a sheet conveyance device comprising a conveyance unit configured to convey a sheet, a detection unit configured to detect a front end and a rear end of a sheet conveyed with the conveyance unit, a measurement unit configured to measure a sheet length in a conveyance direction based on a detection result of the detection unit, an acquisition unit configured to acquire a reference length of the sheet in the conveyance direction, a computation unit configured to compute a correction value that is used to correct a length measured by the measurement unit based on a measured value of the sheet length in the conveyance direction measured by the measurement unit and the reference length acquired by the acquisition unit in a correction mode in which the length measured by the measurement unit is corrected, a storage unit configured to store the correction value computed by the computation unit, and a determination unit configured to determine a sheet length corrected based on the correction value stored in the storage unit and the length measured by the measurement unit at the time of conveyance of a sheet in a mode other than the correction mode.

Accordingly, a second aspect of the present invention provides a sheet conveyance device comprising a conveyance unit configured to convey a sheet, a detection unit configured to detect a front end and a rear end of a sheet conveyed with the conveyance unit, a measurement unit configured to measure a sheet length in a conveyance direction based on a detection result of the detection unit, a storage unit configured to store information representing a relation between sheet lengths measured by the measurement unit and reference lengths, and a determination unit configured to determine a sheet length based on the information stored in the storage unit and the measured value measured by the measurement unit at the time of the sheet conveyance with the conveyance unit.

Accordingly, a third aspect of the present invention provides a control method for a sheet conveyance device having a conveyance unit that conveys a sheet and a detection unit that detects a front end and a rear end of the sheet conveyed with the conveyance unit, the control method comprising a measurement step of measuring a sheet length in a conveyance direction based on a detection result of the detection unit, an acquisition step of acquiring a reference length of the sheet in the conveyance direction, a computation step of computing a correction value that is used to correct a length measured in the measurement step based on a measured value of the sheet length in the conveyance direction measured in the measurement step and the reference length acquired in the acquisition step in a correction mode in which the length measured in the measurement step is corrected, a storing step of storing the correction value computed in the computation step into a memory, and a determination step of determining a sheet length corrected based on the correction value stored in the memory and the length measured in the measurement step at the time of conveyance of a sheet in a mode other than the correction mode.

Accordingly, a fourth aspect of the present invention provides a control method for a sheet conveyance device having a conveyance unit that conveys a sheet and a detection unit that detects a front end and a rear end of the sheet conveyed with the conveyance unit, the control method comprising a measurement step of measuring a sheet length in a conveyance direction based on a detection result of the detection unit, a storing step of storing information representing a relation between measured values corresponding to sheet sizes and reference lengths of the sheet sizes into a memory, and a determination step of determining a sheet length based on the measured value measured in the measurement step and the information stored in the memory.

According to the present invention, a sheet length in a conveyance direction can be correctly detected, and a length of a non-standard size sheet can be also detected correctly. Moreover, when the sheet conveyance device of the present invention is applied to a reading device, the reading device detects a length of a sheet conveyed correctly and reads an image on the sheet just enough.

Further features of the present invention will become apparent from the following description of exemplary embodiments with reference to the attached drawings.

BRIEF DESCRIPTION OF THE DRAWINGS

FIG. 6 is a view showing an original size selection screen displayed in step S502 in FIG. 5.

FIG. 7 is a view showing an original length designation screen displayed in step S505 in FIG. 5 for designating the original length in the conveyance direction.

FIG. 8 is a view showing a conveyance start instruction screen displayed after step S504 or S505 in FIG. 5.

FIG. 13 is a view showing a correction value table that stores a reference size of an original, a reference length of an original, a sampled length, and a difference and associates them mutually, in the original reading device shown in FIG. 1.

DESCRIPTION OF THE EMBODIMENTS

Hereafter, embodiments according to the present invention will be described in detail with reference to the drawings.

Figure 1:
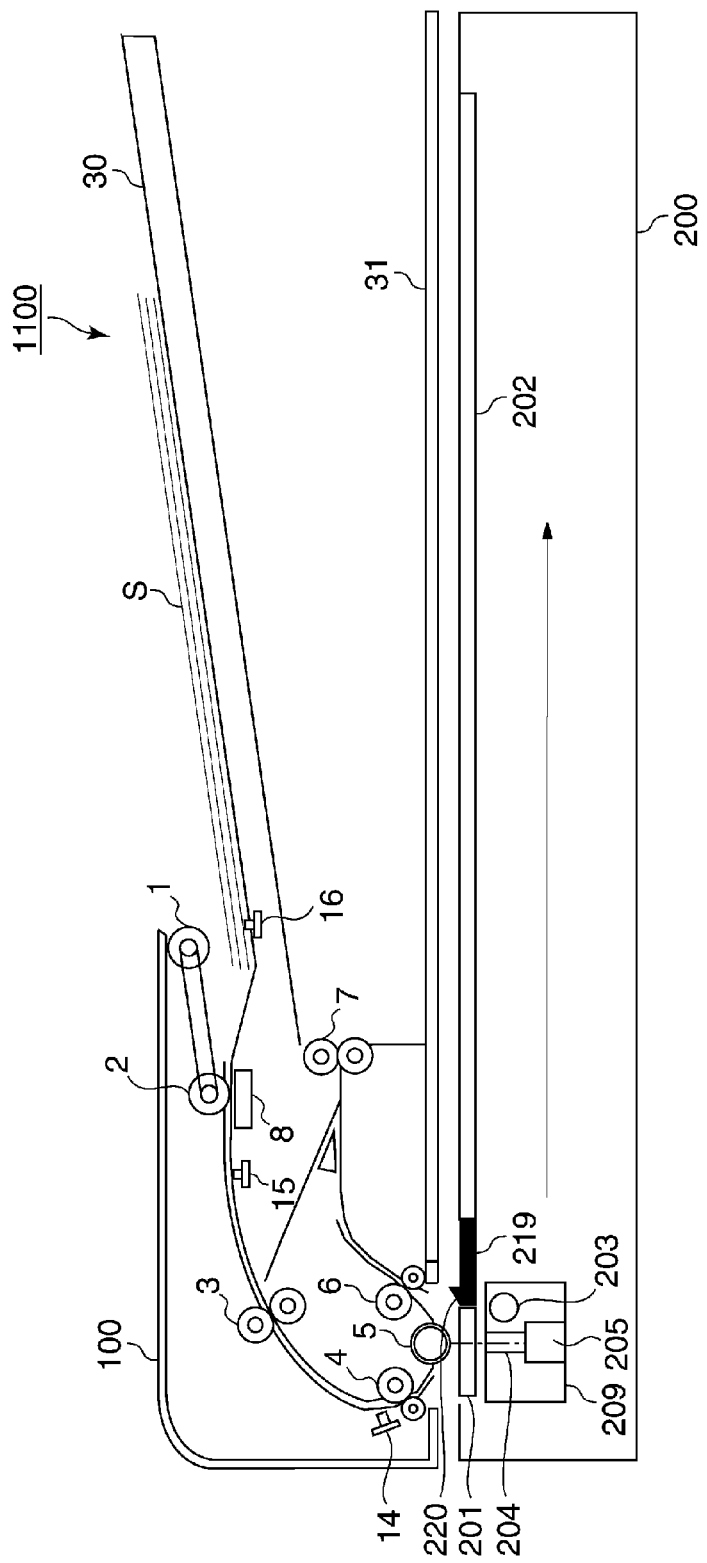
FIG. 1 is a view schematically showing a configuration of an original reading device according to a first embodiment of the present invention.
Figure 2:
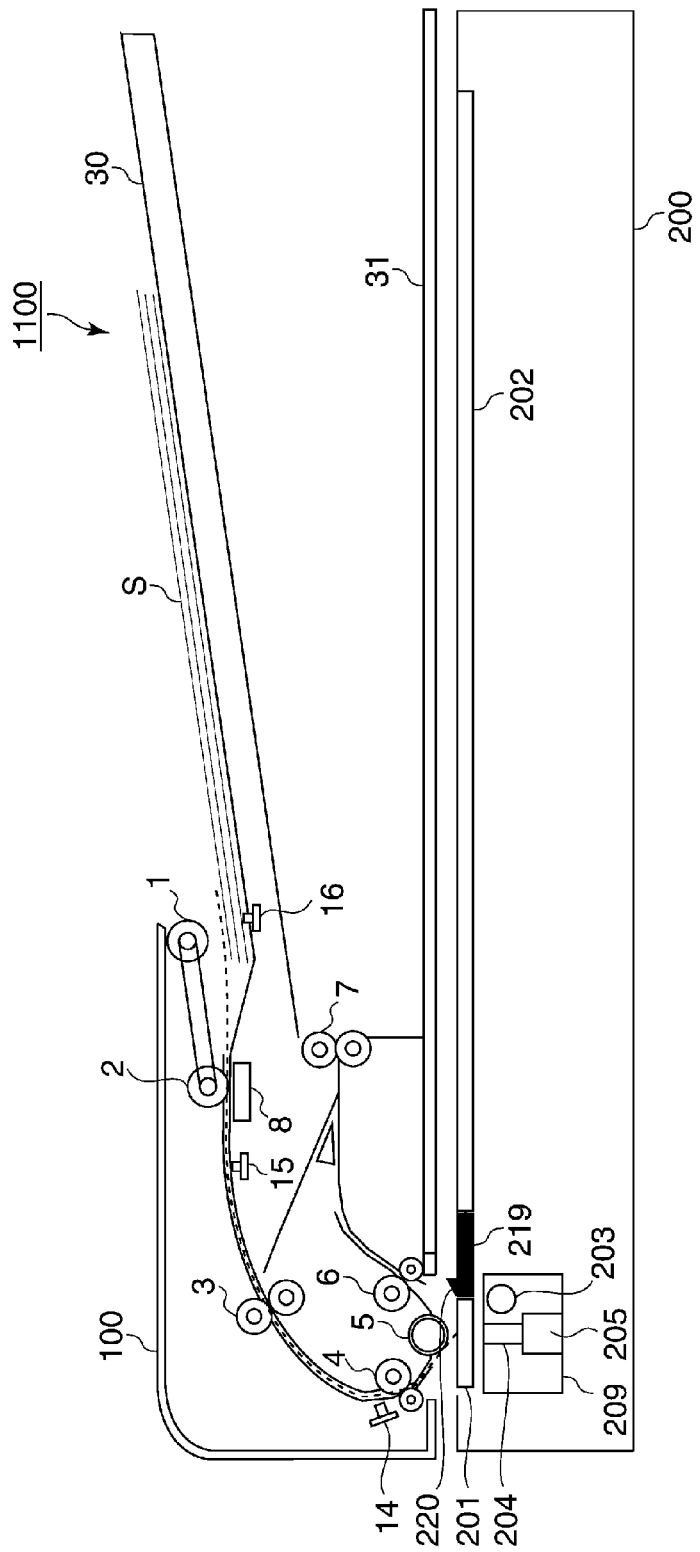
FIG. 2 is a view showing a state where an original front end arrived at a read position during an original conveyance by an automatic original feeding unit of the original reading device shown in FIG. 1.
Figure 3:
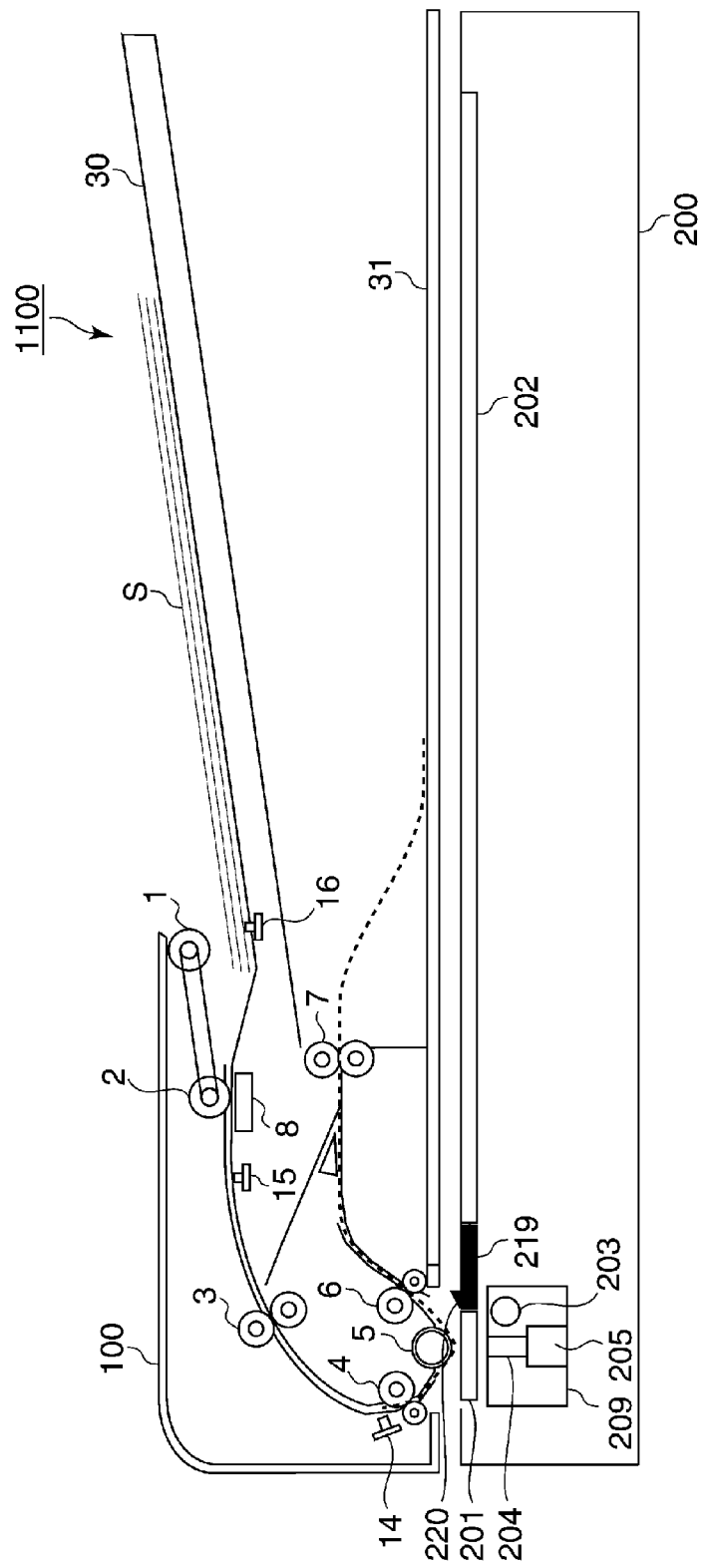
FIG. 3 is a view showing a state where an original rear end passes through a position of a read sensor during the original conveyance by the automatic original feeding unit of the original reading device shown in FIG. 1.

FIG. 1 is a view schematically showing a configuration of an original reading device according to a first embodiment of the present invention. FIG. 2 is a view showing a state where an original front end arrived at a read position during an original conveyance by an automatic original feeding unit of the original reading device shown in FIG. 1. FIG. 3 is a view showing a state where an original rear end passes through a position of a read sensor during the original conveyance by the automatic original feeding unit of the original reading device shown in FIG. 1.

Figure 4:
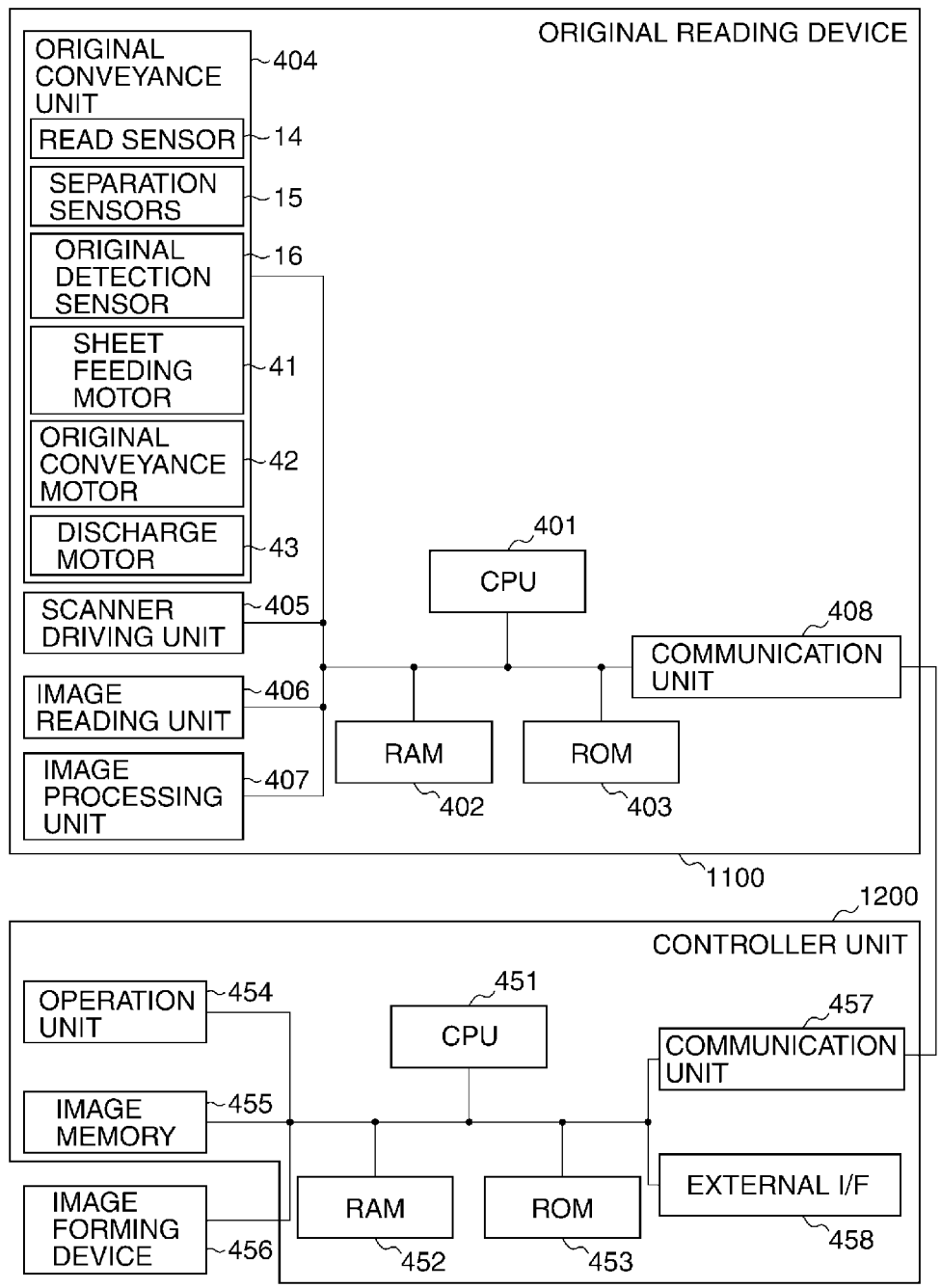
FIG. 4 is a block diagram showing a functional constitution of a copying machine containing the original reading device shown in FIG. 1.

As shown in FIG. 1 through FIG. 3, the original reading device 1100 consists of an automatic original feeding unit (abbreviated as an ADF, hereafter) 100, an image reading unit (abbreviated as a reader, hereafter) 200, and a control system containing a CPU 401 (see FIG. 4). FIG. 1 shows a state where an original bundle S that consists of a plurality of originals is set on an original tray 30.

The ADF 100 is provided with a feed roller 1, a separation roller 2, a conveying roller pair 3, a conveying roller pair 4, an original reading roller 5, a conveying roller pair 6, an ejection roller pair 7, a separation pad 8, a read sensor 14, a separation sensors 15, an original detection sensor 16, the original tray 30, an original ejection tray 31, etc. The reader 200 is provided with an original glass 201, an original glass 202, a scanner unit 209 in which an LED 203, a lens 204, and an image sensor 205 are unitized, a standard white plate 219 having a guide member 220, etc.

Next, an original reading operation using the ADF 100 in the original reading device 1100 having the above-mentioned configuration will be described with reference to FIG. 1 through FIG. 3. Light emitted from the LED 203 of the scanner unit 209 irradiates an original over the scanner unit 209. Reflected light from the original forms an original image on the image sensor 205 via the lens 204. When an original image reading job using the ADF 100 is started, the below-mentioned CPU 401 moves the scanner unit 209 to a position just under the standard white plate 219, and executes shading compensation.

In the shading compensation, the output value from the image sensor 205 in a deep-black state where the LED 203 is OFF and the output value from the image sensor 205 in a pure white state where the LED 203 is ON are sampled, and a reading level for reading an original image is normalized. Usually, when analog brightness of light received with an image sensor is converted into a digital value, the level of the digital value corresponding to an intermediate analog brightness (gray, etc.) is determined with reference to the pure white level and the deep-black level.

Following the shading compensation, the CPU 401 moves the scanner unit 209 to the position just under the original glass 201, and makes it stand by until an original is conveyed to an original reading position by the ADF 100. When the original image reading job is started, the feed roller 1 contacts the top original of the original bundle S stacked on the original tray 30 of the ADF 100, and starts rotating. Thereby, the top original is fed.

The separation roller 2 and the separation pad 8 separate the only one top original from the original bundle S and control the feeding of other originals (multi feeding) using a well-known separation technique when the feed roller 1 feeds the top original from the original tray 30 on which the original bundle S is stacked.

Although the peripheral velocity of the separation roller 2 is almost the same as that of the conveying roller pair 3, since an original is conveyed only by the separation roller 2 until the original reaches the conveying roller pair 3, the original is conveyed at a velocity slower than the peripheral velocity of the separation roller 2 due to friction between the original and the separation pad 8. When the original is conveyed to the conveying roller pair 3, the original is accelerated to the peripheral velocity of the conveying roller pair 3 by the nip pressure of the conveying roller pair 3 and is conveyed.

The conveying roller pair 4 that conveys an original toward the original glass 201 is arranged in the conveyance path at the downstream side of the conveying roller pair 3. The original conveyed by the conveying roller pair 4 is sent to the original reading position on the original glass 201 in the vicinity of the original reading roller 5. When the front end of the original reaches the read sensor 14 during the conveyance of the original toward the original reading position, the output of the read sensor 14 is switched from OFF to ON.

Counting of driving pulses of the below-mentioned original conveyance motor 42 (see FIG. 4) used as a driving source for the conveying roller pair 3, the conveying roller pair 4, the original reading roller 5, and the conveying roller pair 6 is started at the timing of the turning ON of the read sensor 14 by detecting the front end of the original. Conveyance distance of an original per one driving pulse is common to the conveying roller pair 3, the conveying roller pair 4, the original reading roller 5, and the conveying roller pair 6. Accordingly, the position to which the original is conveyed (the position of the front end of the original) can be determined by counting driving pulses after the timing of the turning ON of the read sensor 14.

Accordingly, the driving pulse count that is counted from the timing of the turning ON of the read sensor 14 to the timing of arrival of the front end of the original to the original reading position on the original glass 201 as shown by a dotted line in FIG. 2 is beforehand stored as reading start pulse count. The CPU 401 starts reading an image of the original using the scanner unit 209 when the driving pulse count reaches the reading start pulse count. The original that passed through the original reading position on the original glass 201 is bent upward in the drawing by the guide member 220 mounted on the top of the standard white plate 219, and enters the nip of the conveying roller pair 6.

Moreover, when determining that the rear end of the original passed the separation sensor 15, the CPU 401 detects whether any original is on the original tray 30 using the original detection sensor 16. When any original is on the original tray 30, the following original will be fed.

When the rear end of an original passes the read sensor 14 as shown in FIG. 3, the read sensor 14 turns OFF. The CPU 401 terminates the image reading process for the original by the scanner unit 209 when the driving pulse count of the original conveyance motor 42 from this timing reaches reading end pulse count that is more than the reading start pulse count.

In order to prevent lack of the image at the time of reading, the image reading process for the original by the scanner unit 209 is terminated after the rear end of the original fully passes the image reading position so that the image read from the original contains a part following the rear end of the original.

Specifically, the image reading process is terminated when time corresponding to the conveyance distance of 3 mm, for example, elapses after the rear end of the original is read in this embodiment. That is, the reading end pulse count is acquired by adding pulse count corresponding to the conveyance distance of 3 mm to the reading start pulse count.

When the original is ejected to the original ejection tray 31 by the ejecting roller pair 7 after the rear end of the original passes through the original reading roller 5, the ejecting roller pair 7 rotates additionally so that the rear end of the original may not be caught in the ejecting roller pair 7. At this point, a one-side reading sequence for reading an image of one side of an original is completed. The feeding of an original, the image reading of the original, and the ejection of the original mentioned above are repeated fundamentally until the original detection sensor 16 detects that there is no original on the original tray 30, except for the case where an original reading job designates the number of originals to be read.

Next, measurement of an original length in the conveyance direction will be described. As mentioned above, when an original length in the conveyance direction is measured, the driving pulse count of the original conveyance motor 42 is counted between the timing of which the read sensor 14 turned ON and the timing of which the read sensor 14 turned OFF.

It should be noted that the driving pulse counter is shared for the purpose of generating an original-image-reading-start timing and for the purpose of measuring a length of an original in this embodiment. That is, the count of driving pulses is started at the timing of the turning ON of the read sensor 14. When the driving pulse count reaches the reading start pulse count mentioned above, the process of reading an image of an original is started. Moreover, the driving pulse counter is reset to 0 and restarts counting at this timing.

The driving pulse count that is counted after resetting is acquired at the timing of which the read sensor 14 turned OFF, and the reading start pulse count is added to the acquired driving pulse count. Thereby, the driving pulse count from the timing of the turning ON to the timing of the turning OFF of the read sensor 14 can be acquired.

For example, when the conveyance distance of the original per one driving pulse is 0.04233 mm (=a width of one pixel in the resolution of 600 dpi) and the distance from the read sensor 14 to the original reading position is 30.9 mm, the reading start pulse count, which is counted from the timing of the turning ON of the read sensor 14 to the timing of the arrival of the original to the original reading position, is about 730 as shown in the following formula.

$$30.9 \text{ mm}/0.04233 \text{ mm} = 729.97$$

Accordingly, the process for reading an image of the original is started when the driving pulse count reaches 730 after the read sensor 14 turns ON.

Furthermore, when the driving pulse count from the timing of the start of the image reading process to the timing of the turning OFF of the read sensor 14 is 6286, the original length in the conveyance direction is about 297 mm (equivalent to A4 size) as shown in the following formula.

$$0.04233 \text{ mm}*(730+6286) = 296.98 \text{ mm}$$

Next, an original image reading operation without using the ADF 100 will be described. In the case of the original image reading operation without using the ADF 100, an operator lays an original on the original glass 202. When the operator designates to start reading, the CPU 401 moves the scanner unit 209 to a position just under the standard white plate 219, and executes shading compensation. After termination of the shading compensation, the CPU 401 moves the scanner unit 209 to an approach start position that is left side of the position just under the original glass 201 in FIG. 1, and stops the scanner unit 209.

After the scanner unit 209 stops at the approach start position, the CPU 401 moves the scanner unit 209 in the arrow direction in FIG. 1 to read an image of the original on the original glass 202. The original reading device 1100 moves the scanner unit 209 by the scanning length based on the original size designated from the controller unit while reading the original image. And then, the scanner unit 209 is moved to the position just under the standard white plate 219. Thereby, the original reading operation is finished.

FIG. 4 is a block diagram showing a functional constitution of a copying machine 1000 containing the original reading device 1100 shown in FIG. 1. As shown in FIG. 4, the copying machine 1000 is provided with the controller unit 1200 that controls the entire copying machine and an image forming device 456 that is a printer of an electrophotographic system in addition to the original reading device 1100. The original reading device 1100 is provided with the CPU 401, a RAM 402, a ROM 403, an original conveyance unit 404, a scanner driving unit 405, an image reading unit 406, an image processing unit 407, and a communication unit 408. The controller unit 1200 is provided with a CPU 451, a RAM 452, a ROM 453, an operation unit 454, an image memory 455, a communication unit 457, and an external I/F 458.

The CPU 401 unifies the reader 200 and the ADF 100 as the original reading device 1100, and controls it. The ROM 403 stores a control program executed by the CPU 401.

The RAM 402 is used as a workspace of the CPU 401. Moreover, the RAM 402 is used also as a temporary storage area that stores image data to which the image processing unit 407 applies a process like the shading compensation and image data read by the image reading unit 406 until the data is transmitted to the controller unit. Moreover, the RAM 402 stores a correction value table (see FIG. 13) that associates a reference length (a reference value) that is an ideal length of an original in a reference size in the conveyance direction with a sampled length as a measured original length in the conveyance direction and a difference (a correction value) between the reference length and the sampled length.

The original conveyance unit 404 is provided with the read sensor 14, the separation sensors 15, the original detection sensor 16, a sheet feeding motor 41, the original conveyance motor 42, and a discharge motor 43. The sheet feeding motor 41 drives the feed roller 1 and the separation roller 2. The original conveyance motor 42 drives the conveying roller pair 3, the conveying roller pair 4, the original reading roller 5, and the conveying roller pair 6. The discharge motor 43 drives the ejecting roller pair 7. The original conveyance unit 404 controls conveyance of originals stacked on the ADF 100 based on signals from the read sensor 14, the separation sensors 15, the original detection sensor 16, etc. It should be noted that FIG. 4 shows the sensors and the motors only as the elements of the original conveyance unit 404 but does not show other elements.

The scanner driving unit 405 moves the scanner unit 209 to the position just under the original glass 201, the standard white plate 219, or the original glass 202 according to a content of a job. The image reading unit 406 controls the LED 203, the lens 204, and the image sensor 205 that constitute the scanner unit 209 so as to read an image in a designated operation mode.

The image processing unit 407 eliminates unnecessary regions in the image read by the image reading unit 406, processes the image data into suitable format, and then, transfers the image data to the controller unit via the communication module 408. The communication module 408 receives a content of a job that is designated by the controller unit as the original reading device, and sends image data to the controller unit.

The CPU 451 controls the entire copying machine. The copying machine also has an image forming function for printing the original image read by the original reading device onto a recording sheet by issuing a print instruction to the image forming device 456. The ROM 453 stores a control program executed by the CPU 451.

The RAM 452 is used as a workspace of the CPU 451 required for controlling the copying machine 1000. Moreover, the RAM 452 is used also when image data is temporally held until it is stored in the image memory 455 that is a nonvolatile memory and when image data read from the image memory is transferred to the external I/F 458 that is an interface to a network line.

The operation unit 454 is a user interface that displays a content of a job that is currently executed by the copying machine 1000, and that receives various detailed settings to the copying machine 1000 by a user. The image memory 455 stores the image data transmitted from the external I/F 458 or the communication unit 457, and generally consists of a large capacity memory, such as hard disk drive. The image forming device 456 performs a series of image forming processes that print and output an image to a recording sheet.

As mentioned above, the original length in the conveyance direction is detectable by multiplying the driving pulse count from the timing of the turning ON of the read sensor 14 to the timing of the turning OFF by the conveyance distance per one driving pulse. However, the conveyance distance per one driving pulse of the original conveyance motor 42 varies slightly owing to slip of a conveying roller, meandering of an original, manufacturing variation of a roller, and wearing of a roller. Accordingly, even if the original length in the conveyance direction is computed by multiplying the driving pulse count that is counted with reference to the detection timings of the read sensor 14 by the ideal conveyance distance per one driving pulse, the computed length may deviate from the actual length slightly.

When a recording sheet is selected based on the computed original length that differs from the actual length, an image may be missing in a printed recording sheet or the image of the original reading roller 5 may be printed as a black belt. Accordingly, a difference (measurement error) between a computed original length and an actual length is set as a correction value using an original of a standard size or an original of which length is designated by a user. The computed original length is corrected using the correction value. A process for setting the correction value will be described using FIG. 5 through FIG. 8.

Figure 5:
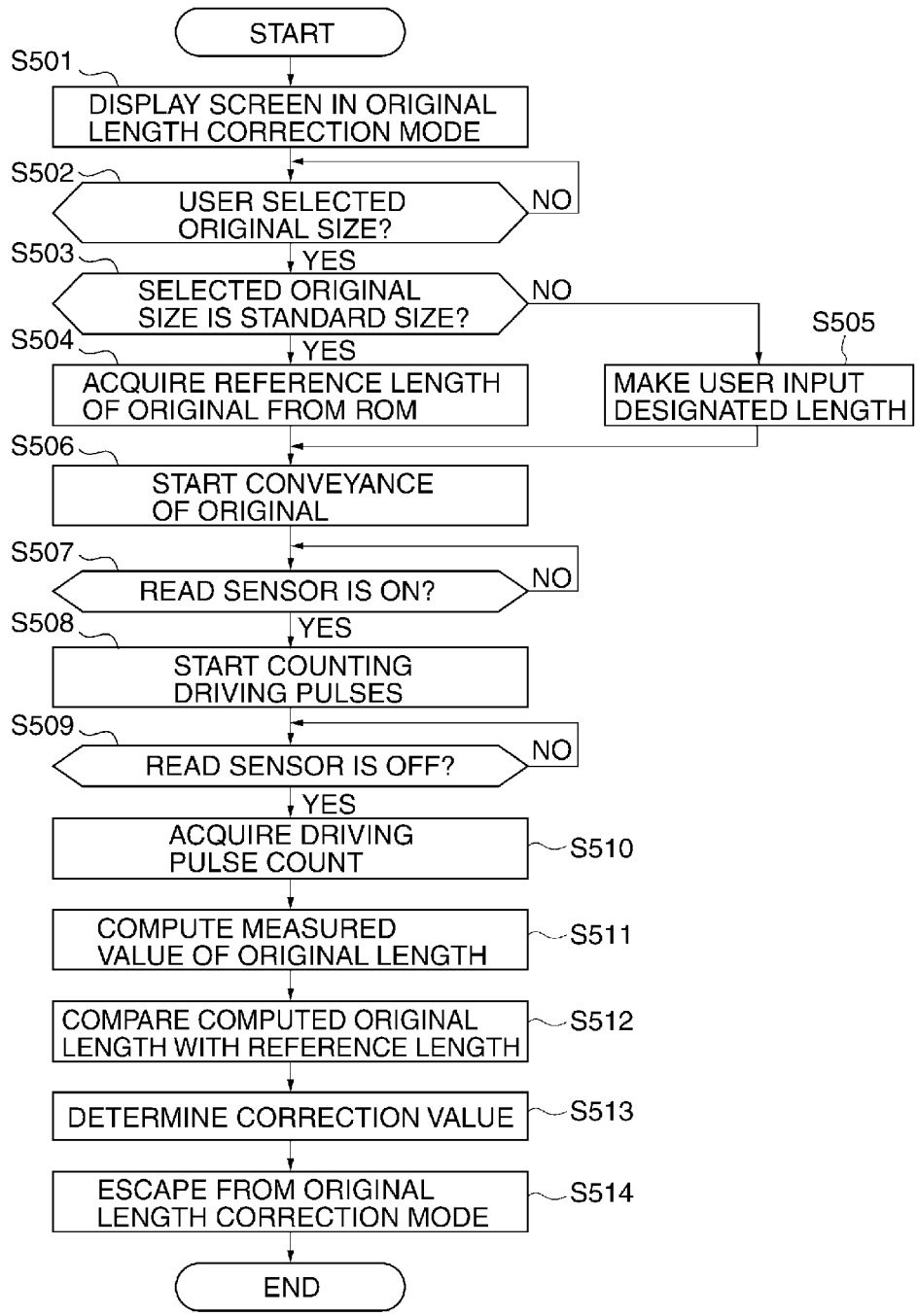
FIG. 5 is a flowchart showing a process for setting a correction value for an original length in a conveyance direction in the original reading device shown in FIG. 1.

FIG. 5 is a flowchart showing a process for setting a correction value for an original length in the conveyance direction in the original reading device 1100. FIG. 6 is a view showing an original size selection screen displayed in step S502 in FIG. 5. FIG. 7 is a view showing an original length designation screen displayed in step S505 in FIG. 5. FIG. 8 is a view showing a conveyance start instruction screen displayed after step S504 or S505 in FIG. 5.

As shown in FIG. 5, the CPU 401 displays a screen in an original length correction mode on the operation unit 454 according to an operation by a user on the operation unit 454 (step S501). That is, when the user operates the operation unit 454 to input predetermined instructions, the CPU 401 displays a menu screen for various settings, and displays an original size selection screen (FIG. 6) that is used to select an original size at the time of setting a correction value for an original length in the conveyance direction on the operation unit 454.

Next, the CPU 401 determines whether the user selected an original size that is a target to acquire a correction value for an original length in the conveyance direction from among the original sizes displayed in the original size selection screen (step S502). As shown in FIG. 6, the original sizes (A4 landscape, B5 landscape, A4 portrait, B5 portrait, A3 portrait, B4 portrait, postcard portrait, user's designation) as selection candidates are displayed on the original size selection screen.

When the user selected the original size, the CPU 401 determines whether the selected original size is a standard size (for example, "A4 landscape", "A3 portrait", etc.) (step S503). When determining that the selected original size is a standard size, the CPU 401 acquires the reference length (normal length) that is the nominal value of the original length from the ROM 403 (step S504).

When the "user's designation" is selected on the original size selection screen, the CPU 401 displays an original length designation screen (FIG. 7) that is used to designate an original length in the conveyance direction on the operation unit 454 (step S505). On this screen, the user inputs the original length in the conveyance direction by directly designating a numerical value via the operation unit 454.

Then, the CPU 401 displays a conveyance start instruction screen (FIG. 8) that is used to instruct starting the conveyance of the original that is a target of measurement of the length on the operation unit 454. When determining that an original is set on the original tray 30 with reference to the detection result of the original detection sensor 16, the CPU 401 validates a "start" button on the conveyance start instruction screen. When the user depresses the "start" button on the conveyance start instruction screen, the CPU 401 starts feeding and conveyance of an original on the original tray 30 by controlling the sheet feeding motor 41 and the original conveyance motor 42 of the original conveyance unit 404 (step S506).

Next, the CPU 401 determines whether the front end of the conveyed original reached the read sensor 14 and turned the read sensor 140N (step S507). The CPU 401 starts counting the driving pulses of the original conveyance motor 42 with the counter from the timing of the turning ON of the read sensor 14 (step S508).

Since an image of the original is not read in this process, the CPU 401 continuously drives the motors while counting the driving pulses without driving the scanner unit 209 until the read sensor 14 detects the rear end of the original and turns OFF (step S509). The CPU 401 acquires the driving pulse count counted by the counter (step S510) at the timing of the turning OFF of the read sensor 14. Next, the CPU 401 computes the original length in the conveyance direction by multiplying the conveyance distance per driving pulse by the acquired driving pulse count (step S511).

Next, the CPU 401 compares the computed original length in the conveyance direction (actual measured value) with the reference length of the original concerned acquired in the step S504 or the length of the original concerned inputted in the step S505 (step S512). The CPU 401 determines the difference of both the compared lengths as a correction value for the original length in the conveyance direction (step S513). Then, the CPU 401 escapes from the original length correction mode (step S514) when detecting depression of a "return" button on the conveyance start instruction screen (FIG. 8) by the user after acquiring the original length for the required original size.

Determination of a correction value for an original length in the conveyance direction will be described using an example. For example, it is assumed that an A4-size original is set on the original tray 30 in landscape orientation (a short side is parallel to the conveyance direction). The length of an A4-size original in the conveyance direction as a nominal value is 210.0 mm. On the other hand, the following formula holds when the driving pulse count acquired in the step S510 in FIG. 5 is 4940.

$$4940*0.04233 \approx 209.1 \text{ [mm]}$$

It should be noted that conveyance distance per one driving pulse is 0.04233 mm.

Accordingly, the correction value in the conveyance direction for the A4-size original in landscape orientation is 0.9 [mm] (=210.0−209.1). That is, the length in the conveyance direction of the A4-size original in landscape orientation will be corrected so as to add 0.9 mm to an actual measured value.

Although the user sets the correction value for the original length in the conveyance direction as one of the various settings in the menu, the similar process may be set by a serviceman as a setting item, or may be set as one of manufacturing processes of the original reading device.

Next, an original reading process using the correction value for the original length in the conveyance direction mentioned above will be described. Fundamentally, the original reading process is performed in the same manner as the original reading operation that uses the ADF as mentioned above. Since the method for using the correction value for an original length in the conveyance direction is characteristic, the process will be described with reference to FIG. 9A through FIG. 12 while focusing on the characteristic section.

Figure 9A:
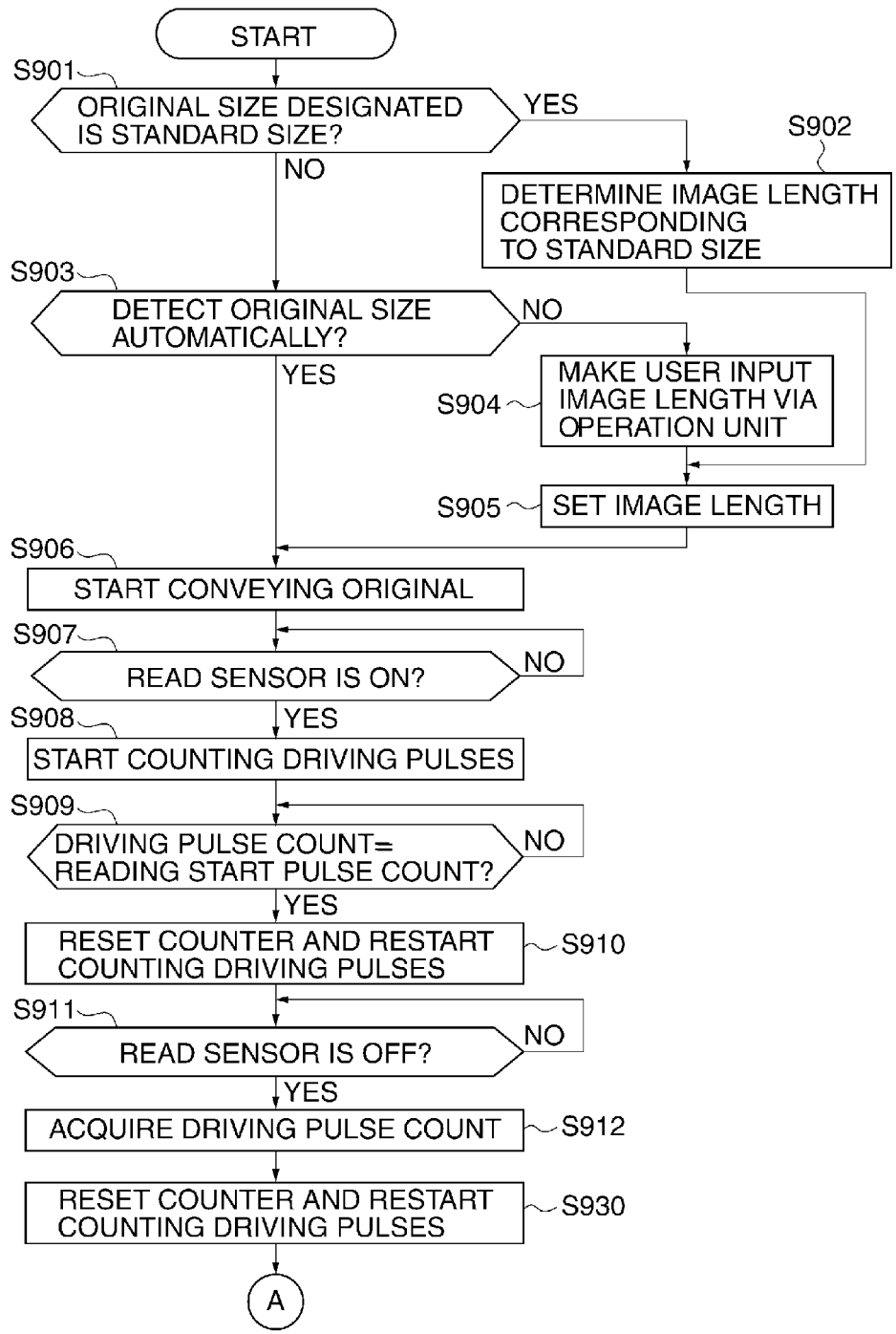
FIG. 9A is a flowchart showing a part of a process for determining the original length in the conveyance direction based on the correction value for the original length in the conveyance direction in the original reading device shown in FIG. 1.
Figure 9B:
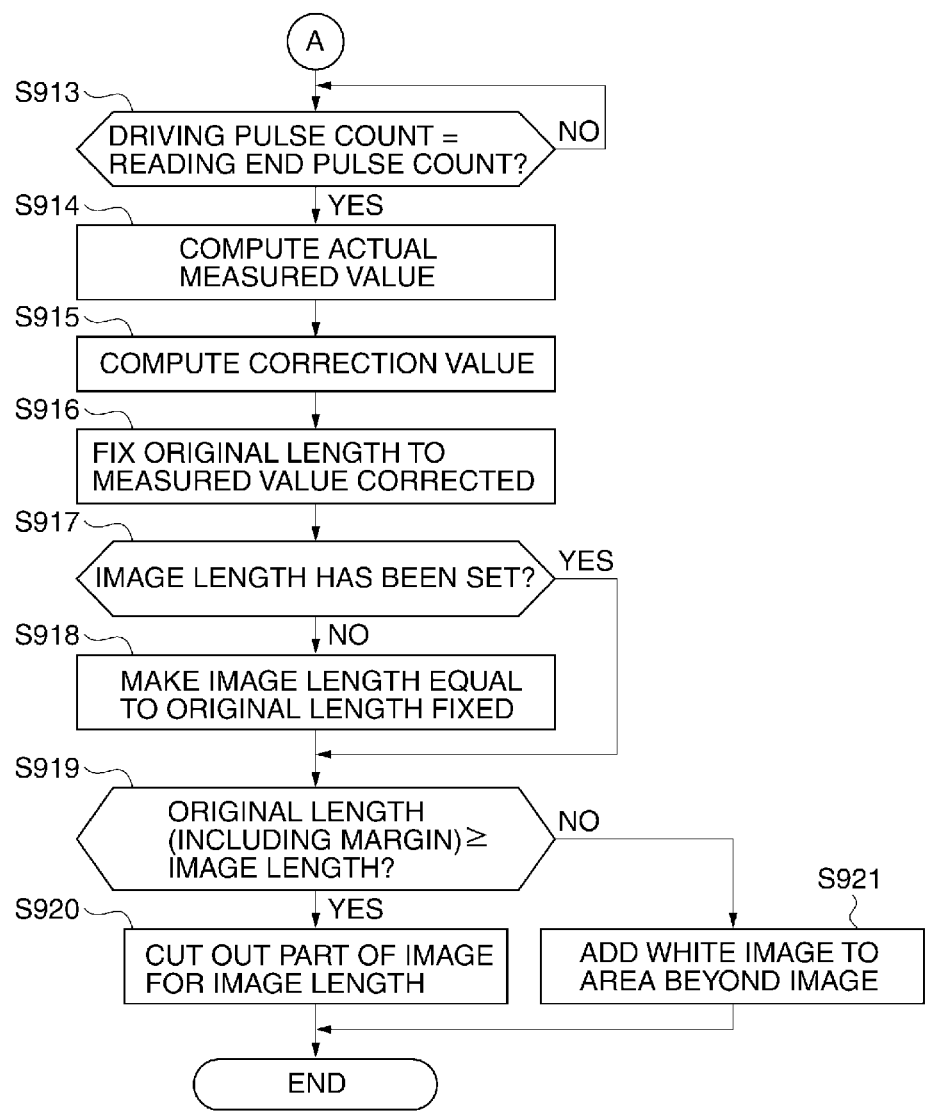
FIG. 9B is a flowchart showing the remainder of the process for determining the original length in the conveyance direction based on the correction value for the original length in the conveyance direction in the original reading device shown in FIG. 1.
Figure 10:
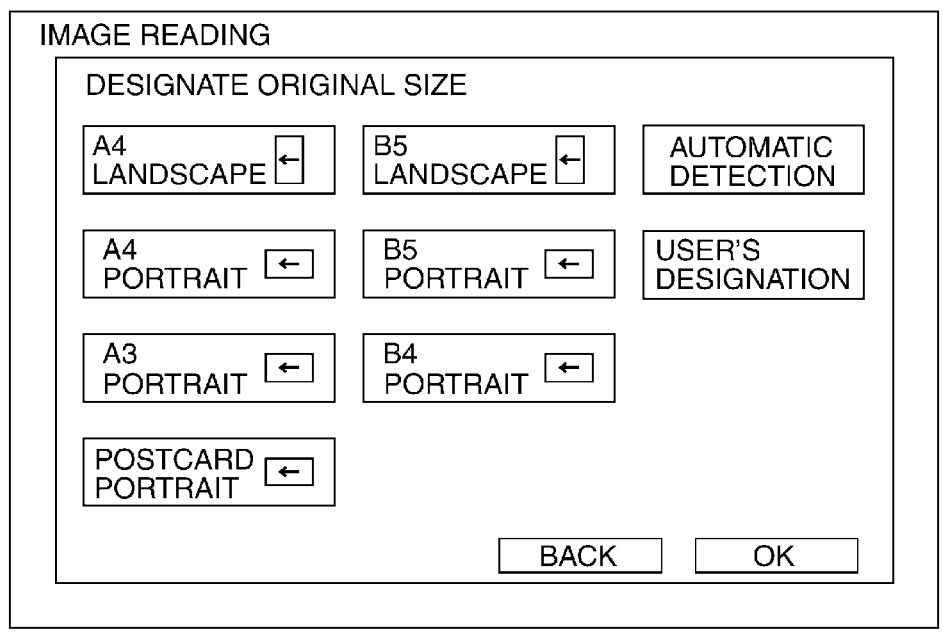
FIG. 10 is a view showing an original size setting screen displayed at the time of reading an original image in the original reading device shown in FIG. 1.

FIG. 9A and FIG. 9B are flowcharts showing a process for determining the original length in the conveyance direction based on the correction value for the original length in the conveyance direction in the original reading device 1100. FIG. 10 is a view showing an original size setting screen displayed at the time of reading an original image.

First, the CPU 401 displays an original size setting screen (FIG. 10) on the operation unit 454 to make a user designate a method of setting a size of an original on the original tray 30. Here, as shown in FIG. 10, buttons that directly designate standard sizes (A4 landscape, B5 landscape, A4 portrait, B5 portrait, A3 portrait, B4 portrait, and postcard portrait), a button that designates "automatic detection", and a button that designates "user's designation" are displayed on the original size setting screen.

The CPU 401 determines whether the original size designated by the user on the original size setting screen is a standard size (step S901). When the original size designated by the user is a standard size, the CPU 401 regards the length in the conveyance direction of the original size selected by the user as a length of an effective image area within the read image irrespective of the original length in the conveyance direction detected at the time of the original conveyance (step S902).

When the original size designated by the user is not a standard size, the CPU 401 determines whether the original reading device is in an automatic detection mode in which the original reading device automatically detects an original size (step S903). When it is not in the automatic detection mode (i.e., when the original size is not a standard size and the user wants to treat the arbitrary length designated by the user as an image area), the CPU 401 makes the user input the image length as a numeric value directly via the operation unit 454 (step S904). Thus, when it is in a mode other than the automatic detection mode, the image length can be set before reading the original (step S905).

Then, the CPU 401 starts conveyance of the original by controlling the original conveyance motor 42 of the original conveyance unit 404 (step S906), and determines whether the front end of the original was detected by the read sensor 14 (step S907). The CPU 401 starts counting the driving pulses with the counter (step S908) at the timing of the turning ON of the read sensor 14 when the front end of the original reached the read sensor 14. Then, the CPU 401 stands by until the front end of the original reaches the original reading position (step S909). It is determined that the front end of the original reaches the original reading position when the driving pulse count reaches the reading start pulse count that is required for conveying the original from the position of the read sensor 14 to the original reading position.

The CPU 401 starts reading the image of the original when the front end of the original reaches the original reading position, and also performs the next process. The CPU 401 resets the driving pulse count that has been counted by the counter till then to "0", and then restarts counting the driving pulses in order to measure the distance from the front end to the rear end of the original (step S910).

The CPU 401 determines whether the rear end of the original is detected by the read sensor 14 (step S911). When the read sensor 14 turns OFF, the CPU 401 acquires the driving pulse count counted with the counter till then (step S912).

Then, the CPU 401 resets the driving pulse count that has been counted by the counter to "0", and restarts counting the driving pulses with the counter (step S930). Then, the CPU 401 reads the image of the original until the driving pulse count reaches the reading end pulse count (YES in the step S913) from the timing of the turning OFF of the read sensor 14. Also at this time, the image reading operation continues for 3 mm after the rear end of the original passes the original reading position, for example. The length 3 mm is a post-image margin area that is acquired on the basis of the driving pulse of the original conveyance motor 42. Since the image reading operation continues for the post-image margin area, shortage of image information can be prevented even when the original length in the conveyance direction increases as a result of a correction process of the original length in the conveyance direction mentioned later.

Next, the CPU 401 determines whether the image reading of the original has finished, i.e., whether the driving pulse count has reached the reading end pulse count (step S913). When the image reading of the original has finished, the CPU 401 totals the driving pulse count acquired when the rear end of the original is detected by the read sensor 14 and the driving pulse count that is counted until the front end of the original reaches the original reading position from the turning ON of the read sensor 14. Then, the CPU 401 computes the measured original length in the conveyance direction (actual measured value) by multiplying the total driving pulse count by the rotation distance of the original reading roller 5 per one driving pulse (step S914).

Specifically, the distance on the theory from the read sensor 14 to the original reading position shall be 30.9 mm, and an adjustment value for compensating the manufacture variations of the parts that constitute the conveyance path shall be −0.5 mm. Moreover, when the driving pulse count that is counted until the read sensor 14 turns OFF from the start of the image reading of the A4-size original in landscape orientation is 4220, the measured original length in the conveyance direction can be acquired as follows.

First, the conveyance distance until the front end of the original reaches the original reading position after the read sensor 14 turns ON is expressed by the following formula in consideration of the compensation of manufacture variations.

$$30.9 \text{ mm} + (-0.5 \text{ mm}) = 30.4 \text{ mm}$$

Accordingly, the reading start pulse count that is counted with the counter until the front end of the original reaches the original reading position from the timing of the turning ON of the read sensor 14 is expressed by the following formula.

$$30.4 \text{ mm} / 0.04233 \approx 718$$

Accordingly, the process for reading an image of the original is started when the driving pulse count becomes 718 after the read sensor 14 turns ON. Then, since the driving pulse count that is counted until the read sensor 14 turns OFF is 4220, the original length in the conveyance direction is acquired by adding the driving pulse count that is counted until the image reading process starts as shown in the following formula.

$$718 + 4220 = 4938$$

$$4938 * 0.04233 \approx 209.0 \text{ mm}$$

That is, the measured original length in the conveyance direction (actual measured value) is 209.0 mm.

As mentioned above, the CPU 401 determines the correction value for the measured original length in the conveyance direction (step S915) with reference to the correction value table shown in FIG. 13. The determination process will be described later. Next, the CPU 401 fixes the original length in the conveyance direction by adding the determined correction value to the measured original length in the conveyance direction (actual measured value) (step S916). For example, when the correction value for the measured original length of 209.0 mm in the conveyance direction shall be +0.9 mm, the original length in the conveyance direction after correction is 209.9 mm.

The CPU 401 determines whether the user has set the image length that will be read from the original (step S917). When the original size has been set in the steps S901 through S905, the length of the set-up original size is used as the image length. When the image length has not been set (i.e., in the automatic detection mode), the CPU 401 makes the image length equal the original length in the conveyance direction fixed in the step S916 (step S918).

Then, the CPU 401 cuts out a required area from the read image. The image reading process continues for 3 mm after the rear end of the original passes the original reading position (the post-image margin area) as mentioned above. Accordingly, since the length of the read image is 3 mm longer than the actual measured value (it is computed in the step S914) before the correction value is not added to the original length in the conveyance direction, the read image includes the image of the added area of 3 mm behind the rear end of the original.

Lack of the image area for the correction value added to the measured original length in the conveyance direction is prevented by reading an excessive image beforehand.

Figure 11:
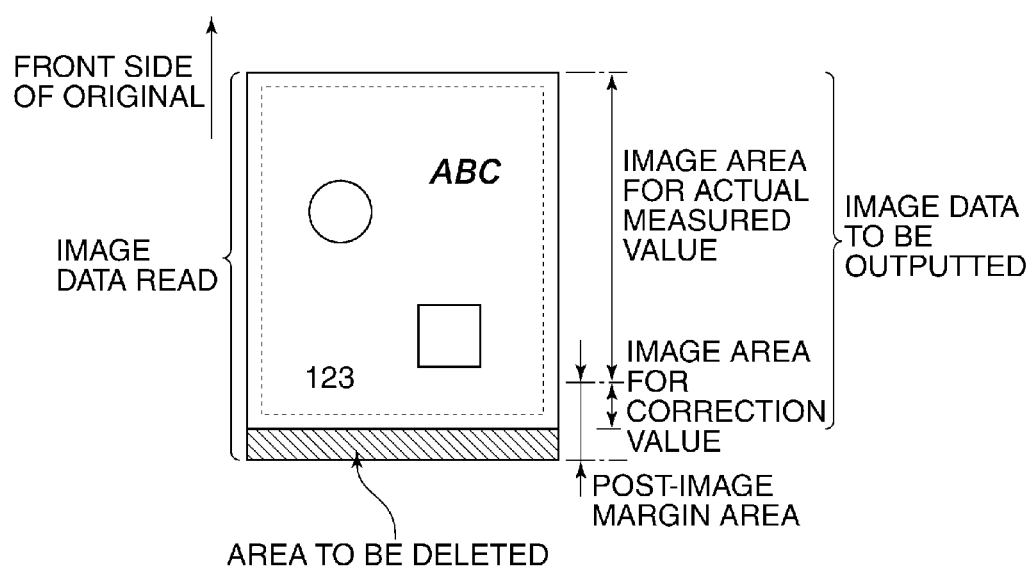
FIG. 11 is a view showing a process for deleting a rear end of an image when an image outputted is smaller than an image read in the original reading device shown in FIG. 1.

The CPU 401 determines whether the original length including the post-image margin area in the conveyance direction is more than the image length that has been set (step S919). When the original length including the post-image margin area in the conveyance direction is more than the image length (i.e., when the image length set is shorter than the length of the original image read by the scanner unit 209), the CPU 401 cuts out a required area (a part for the image length) of the image as shown in FIG. 11 (step S920). That is, the CPU 401 treats the partial image of which the image length is set in the step S905 or the step S918 as an effective image within the image to which the margin area was added.

As shown in FIG. 11, a shadow area will be deleted, and an output image is formed by adding the image area for the correction value to the image area for the actual measured value. It should be noted that an arrow in FIG. 11 represents the direction in which the original is read (the conveyance direction).

Since the correction value does not usually exceed the post-image margin area of 3 mm in the automatic detection mode, an image can be appropriately taken out by taking out the image that is formed by adding the image area for the correction value to the image area for the actual measured value.

Figure 12:
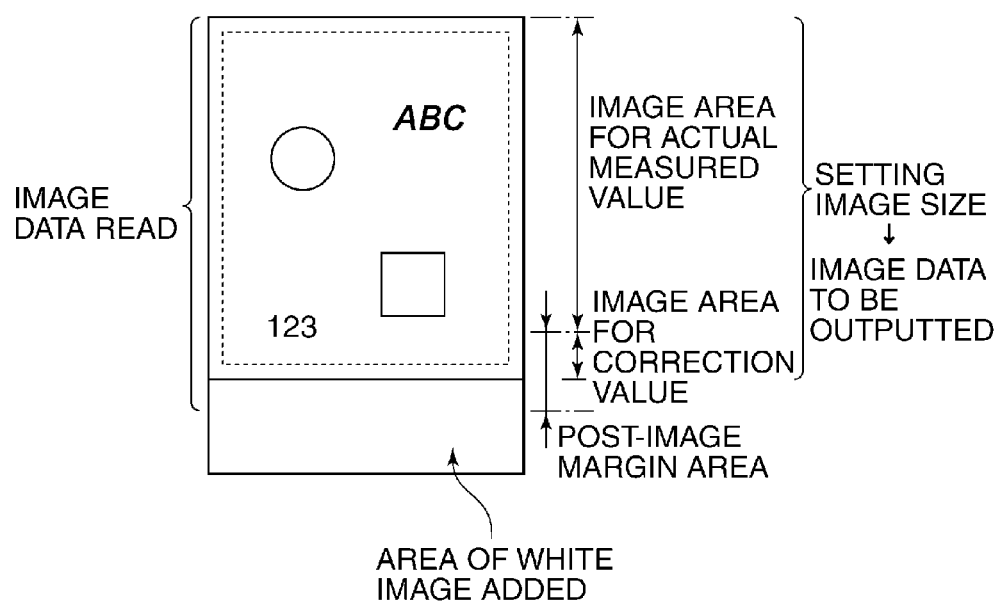
FIG. 12 is a view showing a process for adding a white image to an rear end of an image when an image outputted is larger than an image read in the original reading device shown in FIG. 1.

On the contrary, when the original length including the post-image margin area in the conveyance direction is not more than the image length that has been set (i.e., when the image length set is longer because the entire original should be read even including margin areas, for example), the CPU 401 adds a white image to the area beyond the image area for the correction value (step S921) as shown in FIG. 12 because the required image is larger than the image read.

As shown in FIG. 12, the output image is formed by adding the image area for the correction value and the white image to the image area for the actual measured value.

Next, the method that reflects the correction value for the original length in the conveyance direction set by the process shown in FIG. 5 in the step S915 in FIG. 9B will be described.

The process in FIG. 5 allows to set a correction value with respect to the original size designated by a user. This result serves as the correction value table shown in FIG. 13.

As shown in FIG. 13, the correction value table stores a reference size of an original, a reference length of an original, a sampled length, and a difference and associates them mutually. Set values are storable to the sheet sizes designated by a user (user definition 1, user definition 2) besides the standard sizes, such as A3 size portrait, A4 size portrait, and postcard size portrait.

In the example in FIG. 13, the reference value of the size of the user definition 1 is 1950, and the reference value of the size of the user definition 2 is 2700. The correction value table stores a reference length (a reference value) as a nominal value of an original length in the conveyance direction, a sampled length as a measurement result (an actual measured value of a length in the conveyance direction), and a difference of the reference length and the sampled length for every reference size of an original, and associates them mutually.

In the example in FIG. 13, since the ideal reference length of the A3-size original as a reference size in portrait orientation is 420.0 mm and the measured sampled length is 418.3 mm, the difference value is 1.7 mm. Since the numerical unit of the correction value table is 0.1 mm, the difference value is +17.

Although FIG. 13 shows the example that stores the correlation among a reference length, a sampled length (an actual measured value), and a difference for every reference size of an original (for each of original sizes that are different in length in the conveyance direction), the contents of the correction value table are not limited to this example. A correlation between a sampled length and a correction value may be stored for every reference size of an original, or a correlation between a reference length and a sampled length of an original may be stored.

The process in the step S915 in FIG. 9B for determining the correction value to the actual measured value using the correction value table shown in FIG. 13 will be described with reference to FIG. 14 and FIG. 15.

Figure 14:
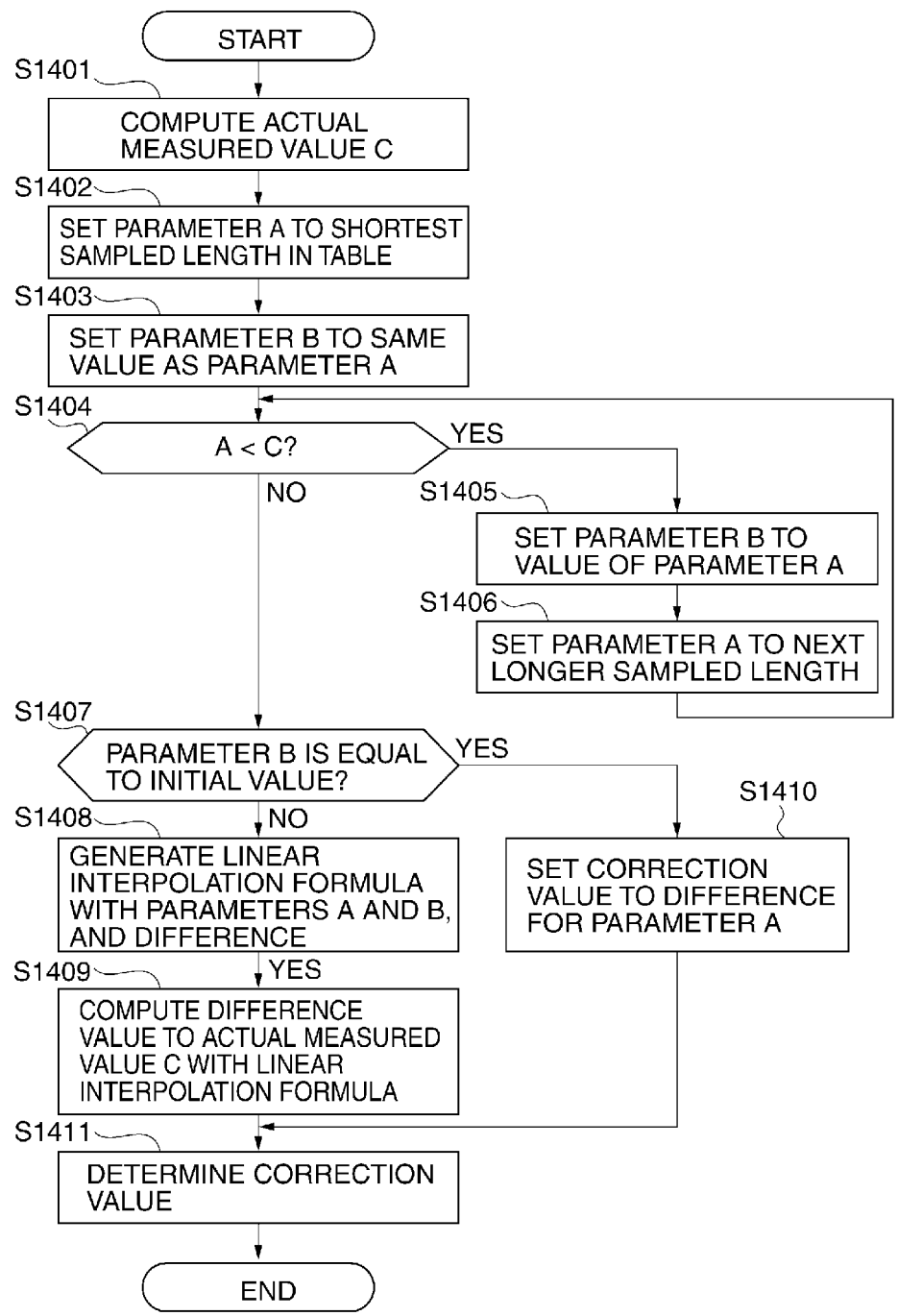
FIG. 14 is a flowchart showing a process for determining a correction value corresponding to an actual measured value of an original length in the conveyance direction using the correction value table in the original reading device shown in FIG. 1.

FIG. 14 is a flowchart showing a process for determining a correction value corresponding to an actual measured value of an original length in the conveyance direction using the correction value table shown in FIG. 13. FIG. 15 is a graph showing a relation between a sampled length and a correction amount for computing a correction value of an original length in the conveyance direction using a linear interpolation. In FIG. 15, the horizontal axis represents the sampled length for every reference size of the original in the correction value table in FIG. 13, and the vertical axis represents the correction amount (difference between the reference length and the sampled length).

As shown in FIG. 14, the CPU 401 computes the actual measured value C (209.0 mm in the embodiment) acquired when an original is actually conveyed in the usual original reading operation in the step S914 in FIG. 9B (step S1401).

Next, the CPU 401 sets a parameter A to the shortest sampled length (the sampled length 1475 of "postcard portrait" in this example) in the correction value table in FIG. 13 (step S1402). The CPU 401 sets another parameter B to the same value as the parameter A (step S1403). After that, the CPU 401 performs a linear interpolation to the actual measured value C using the values in the correction value table.

First, the CPU 401 compares the parameter A with the actual measured value C (step S1404). When the actual measured value C is larger (YES in the step S1404), the CPU 401 sets the parameter B to the value of the parameter A (step S1405), and sets the parameter A to the next longer sampled length (step S1406). The CPU 401 repeats the process in the steps S1405 and S1406 until the parameter A becomes equal to or larger than the actual measured value C (NO in the step S1404). As a result, when the parameter A becomes equal to or larger than the actual measured value C, the parameter B is less than the actual measured value C, and the actual measured value C stands between the parameter A and the parameter B.

Figure 15:
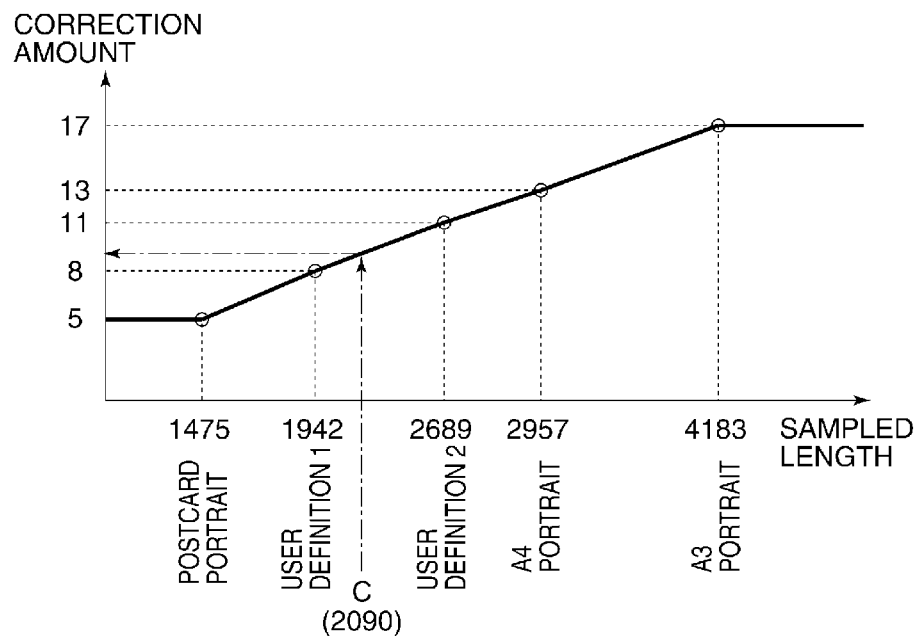
FIG. 15 is a graph showing a relation between a sampled length and a correction amount for computing a correction value of an original length in the conveyance direction using a linear interpolation in the original reading device shown in FIG. 1.

For example, when the actual measured value C of a target original is 2090, the actual measured value C stands between the parameter A and the parameter B when the parameter A becomes 2689 that is the sampled length of the user definition 2 in the correction value table and the parameter B becomes 1942 that is the sampled length of the user definition 1 as shown in FIG. 15. As a result, the determination (A<C) in the step S1404 is NO. If the user definition 2 is not defined, the parameter A is set to the sampled length 2957 of "A4 portrait".

After that, the difference corresponding to the actual measured value C is computed using the linear interpolation based on the actual measured value C and the correction value table that associates the sampled length and the difference for every reference size of an original.

First, the CPU 401 determines whether the parameter B is equal to the initial value "1475" set in the step S1403 (step S1407). When the parameter B is equal to the initial value, the CPU 401 set the correction value for the actual measured value C to the difference value for the smallest sampled length (=parameter A) because the actual measured value C is less than the range of the correction value table (step S1410).

On the other hand, when the parameter B is not equal to the initial value, the CPU 401 computes the difference value (correction value) for the actual measured value C using the following formula (linear interpolation formula) with the values of the parameter A (2689), the parameter B (1492), and the actual measured value C (2090) (step S1408, step S1409).

$$(11-8)*(2090-1942)/(2689-1942)+8=8.59$$

The correction value for the actual measured value C of the original length in the conveyance direction becomes "9" by rounding off below the point of the computed value 8.59. Since the numerical unit is 0.1 mm, the correction value is 0.9 mm (step S1411).

Although the correction value for the original length in the conveyance direction is computed using the linear interpolation formula (correction by a collinear approximation) in this embodiment, it may be computed by a root mean square interpolation formula using a plurality of correction values.

Figure 16:
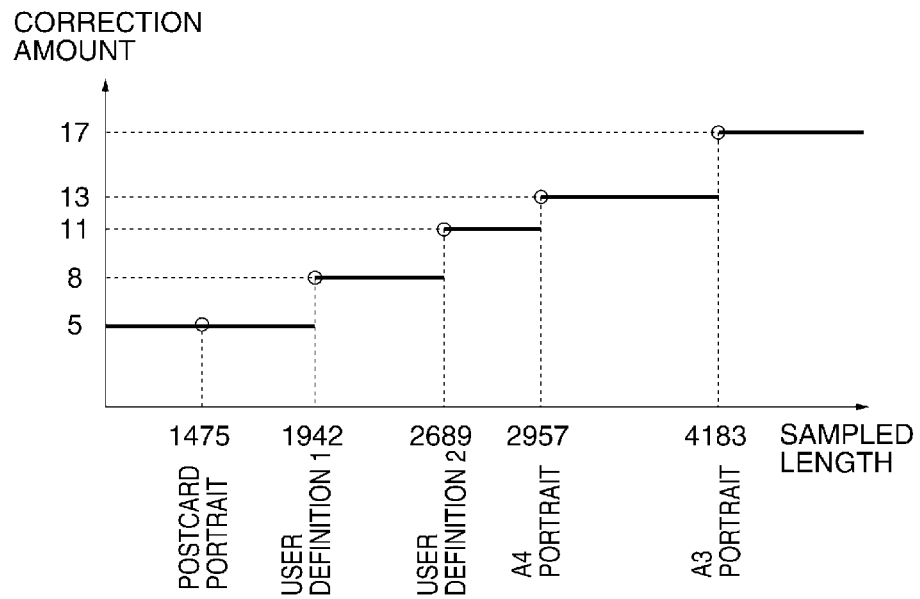
FIG. 16 is a graph showing a relation between a sampled length and a correction amount for computing a correction value of an original length in the conveyance direction in stepwise in the original reading device shown in FIG. 1.

Moreover, a correction value for an original length in the conveyance direction may be computed step-wise as shown in FIG. 16 using an interpolation formula that finds a discrete value. Moreover, since the slip amount of the rollers, such as the original reading roller 5, and the degree of friction with the conveyance path vary dependent on a sheet type of an original like thin paper/thick paper, the correction value may be set for every sheet type when setting a correction value for an original length in the conveyance direction.

As described above, this embodiment has the following effects. Since a correction value for an original length in the conveyance direction is prepared for every reference size, the correction value corresponding to the actual measured value of the original length in the conveyance direction can be computed. This enables to improve the size detection accuracy to an original of an non-standard size, and reduces the possibility of lack of an original image read and the possibility of addition of an image outside an original area.

Next, a second embodiment of the present invention will be described. Since the fundamental configuration of the second embodiment is identical to that of the above-mentioned first embodiment (FIG. 1, through FIG. 4), the descriptions thereof are omitted.

In the first embodiment, the correction value for an original length in the conveyance direction is set at the timing of which a user sets up an original size. However, the rollers, such as the original reading roller 5, slightly wear out whenever they are used, and the conveying state of an original also always varies. Accordingly, a user will set up a correction value for an original length in the conveyance direction after feeling anomalies in an image outputted from the copying machine.

Accordingly, the second embodiment is trying to reduce user's time and trouble by automatically acquiring a correction value for an original length in the conveyance direction. The second embodiment is characterized in the control for selecting a standard size of an original or for directly designating an original length by a user instead of the automatic detection of an original size. Hereafter, the second embodiment will be described using flowcharts shown in FIG. 17A and FIG. 17B.

Figure 17A:
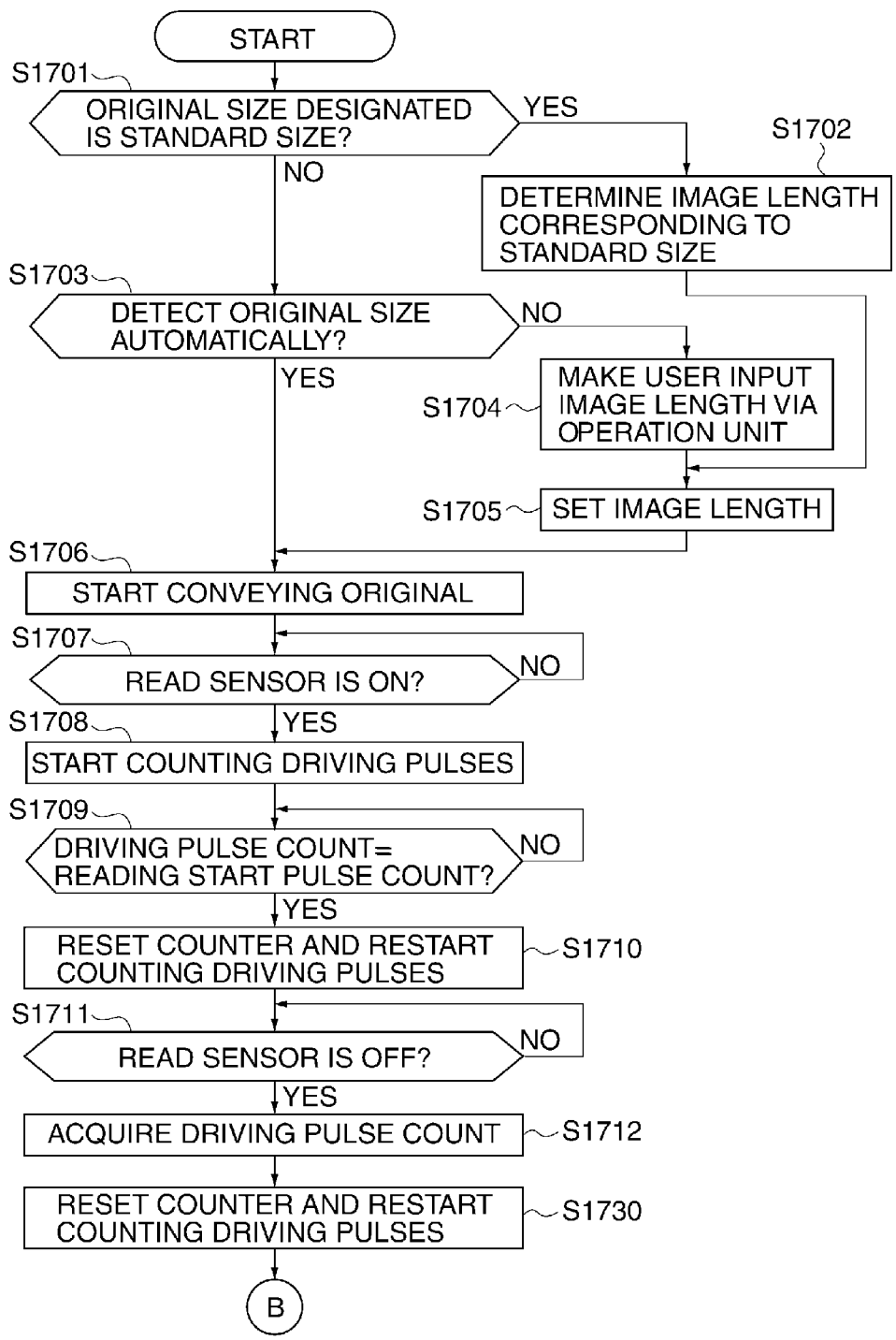
FIG. 17A is a flowchart showing a part of a process for determining an original length in the conveyance direction based on a correction value for the original length in the conveyance direction in a reading device according to a second embodiment of the present invention.
Figure 17B:
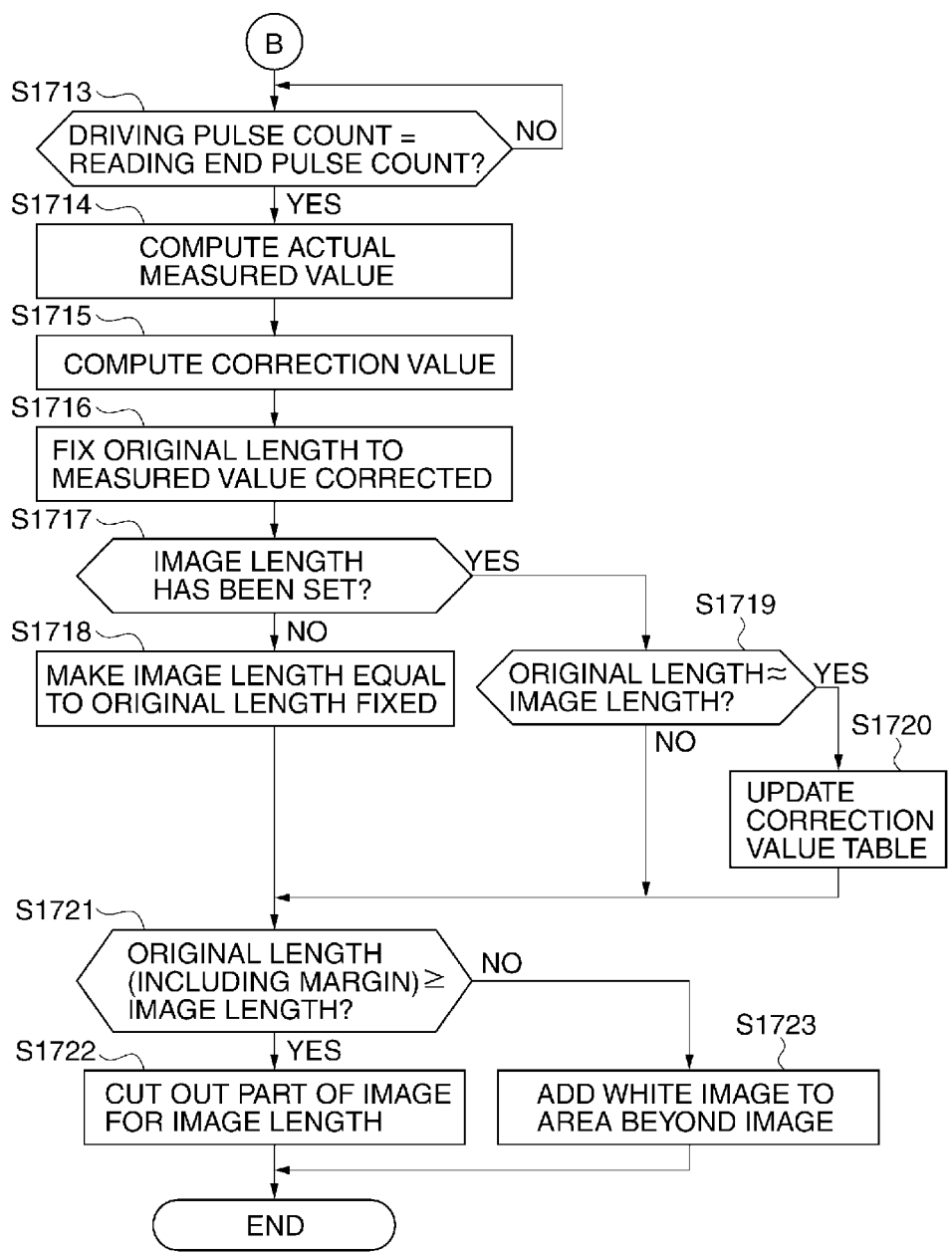
FIG. 17B is a flowchart showing the remainder of the process for determining an original length in the conveyance direction based on a correction value for the original length in the conveyance direction in the reading device according to the second embodiment of the present invention.

FIG. 17A and FIG. 17B are flowcharts showing a process for determining the original length in the conveyance direction based on the correction value for the original length in the conveyance direction in the second embodiment.

The process shown in steps S1701 through S1718 in FIG. 17A and FIG. 17B is the same as the process shown in the steps S901 through S918 in FIG. 9A and FIG. 9B. When the determination result in the step S917 is YES, the process proceeds to the determination in the step S919. On the other hand, when the determination result in the step S1717 is YES, the process proceeds to the determination in step S1719. It is a difference.

An outline will be described. A user sets an original size via the operation unit 454. As a result, an image length is set at the timing prior to reading an original (step S1705) except for the case of the automatic detection of an original size. Then, the CPU 401 conveys the original with the ADF, and determines the original length including a correction value in the conveyance direction by computing the correction value for the original length in the conveyance direction (step S1716).

When the image length is beforehand set by the user (YES in the step S1717), the CPU 401 compares the original length in the conveyance direction determined in the step S1716 with the image length beforehand set (step S1719). When the corrected original length in the conveyance direction is almost equal to the image length (YES in the step S1719), the CPU 401 assumes that the user tried to set the original size in person rather than making the original reading device detect the original size automatically. Accordingly, the CPU 401 updates the correction value table so that the corrected original length in the conveyance direction is coincident with the length designated by the user (step S1720).

In the second embodiment, the criterion of judgment in the step S1719 is determined so as to follow only the slight variation of the original reading device. For example, only when the difference between the corrected original length in the conveyance direction and the designated length is 1 mm or less, the correction value table is updated. When the comparison result in the step S1719 shows a certain difference, the CPU 401 assumes that the image size is different from the original size in the conveyance direction due to user's intention, and does not update the correction value table.

The process shown in steps S1721 through S1723 is the same as the process shown in the steps S919 through S921 in FIG. 9B, and descriptions thereof are omitted.

As mentioned above, the second embodiment allows keeping the detection accuracy of the original length in the conveyance direction without performing the process for acquiring the correction value by a user, when the measured original length in the conveyance direction is almost equal to the designated original size.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-178506, filed on Aug. 10, 2012, which is hereby incorporated by reference herein in its entirety.

What is claimed is:

1. A sheet conveyance device comprising:
a conveyance unit configured to convey a sheet;
a detection unit configured to detect a front end and a rear end of the sheet conveyed by said conveyance unit;
a measurement unit configured to measure a sheet length in a conveyance direction based on a detection result of said detection unit;
an acquisition unit configured to acquire a reference length of the sheet in the conveyance direction;
a computation unit configured to compute a correction value that is used to correct a length measured by said measurement unit based on a measured value of the sheet length in the conveyance direction measured by said measurement unit and the reference length acquired by said acquisition unit in a correction mode in which the length measured by said measurement unit is corrected;
a storage unit configured to store the correction value computed by said computation unit;
a determination unit configured to determine a sheet length corrected based on the correction value stored in said storage unit and the length measured by said measurement unit at the time of conveyance of a sheet in a mode other than the correction mode; and
a selection unit configured to manually select a sheet size of a correction target in the correction mode,
wherein said selection unit has a numeric input unit for manually inputting the sheet length with a numeric value.

2. The sheet conveyance device according to claim 1, wherein said storage unit stores the correction value for the reference length for every sheet size.

3. The sheet conveyance device according to claim 1, further comprising a reading unit configured to read an image of the sheet conveyed by said sheet conveyance unit.

4. The sheet conveyance device according to claim 3, further comprising a control unit configured to control an area of an image output from said reading unit based on the sheet length determined by said determination unit.

* * * * *